J. DUNCAN & B. E. R. NEWLANDS.
PROCESS FOR TREATING SUGAR.
No. 188,873. Patented March 27, 1877.
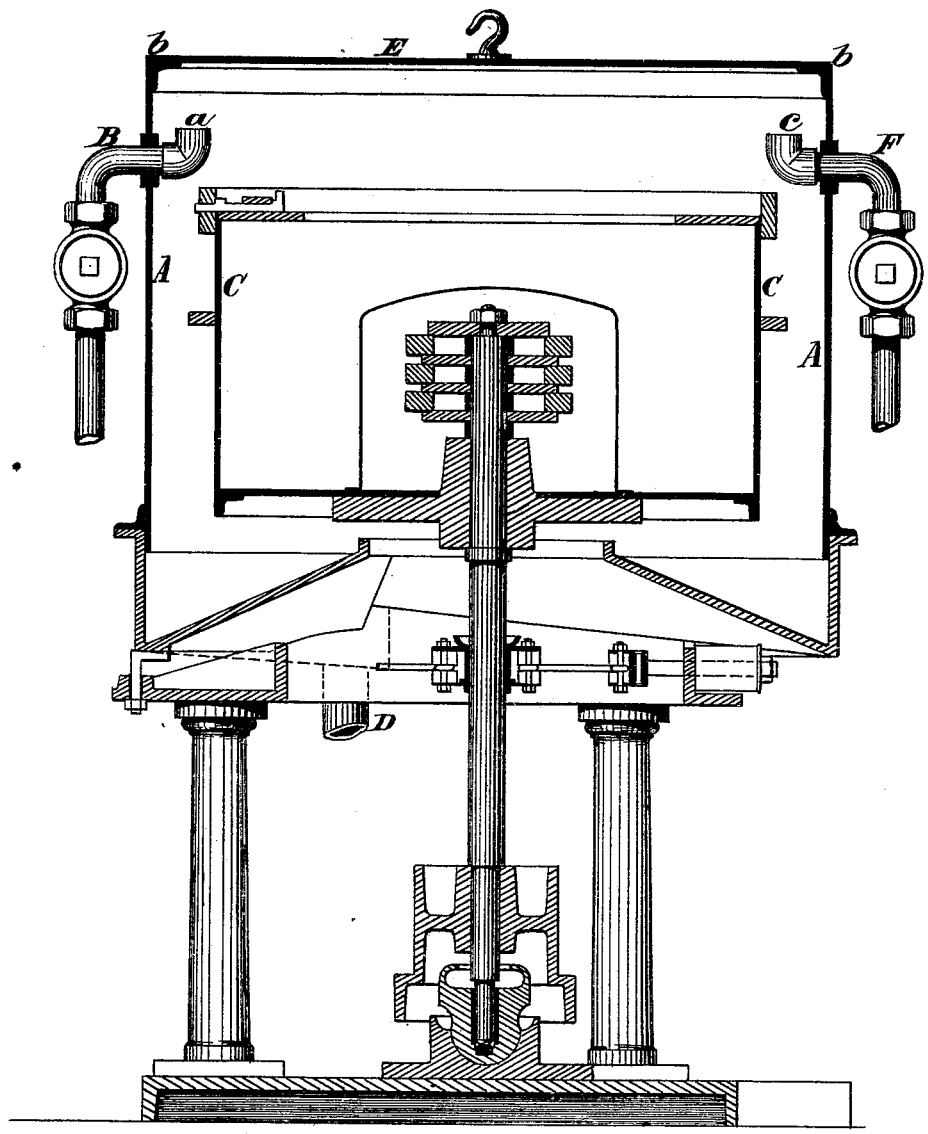

UNITED STATES PATENT OFFICE.

JAMES DUNCAN AND BENJAMIN E. R. NEWLANDS, OF LONDON, ENGLAND.

IMPROVEMENT IN PROCESSES FOR TREATING SUGAR.

Specification forming part of Letters Patent No. 188,873, dated March 27, 1877; application filed February 17, 1877.

*To all whom it may concern:*

Be it known that we, JAMES DUNCAN and BENJAMIN EDWARD REINA NEWLANDS, both of London, England, have invented certain new and useful Improvements in the Method of and Apparatus for Treating Sugar and other saccharine matters when in a powdered, crushed, or crystalized, or semi-liquid condition, to purify the same, of which process and apparatus the following is a specification:

This invention relates to the process of purifying sugars or saccharine matters when in a powdered, crushed, crystalized, or semi-liquid condition by subjecting the same, while contained in a centrifugal machine, to the action of steam, in order to remove soluble impurities therefrom; and it has for its object rendering the apparatus employed in carrying out the process more simple in construction and obtaining an increased weight of pure, or nearly pure, sugar from a given quantity of sugar or saccharine matter operated upon.

In order that our invention may be fully understood, we shall now proceed to particularly describe the same, and for that purpose shall refer to the annexed drawing, which represents a sectional elevation of a centrifugal machine embodying our improvements.

According to our invention, in order to effect the before-mentioned objects, we introduce the steam through the outer casing A of the machine at any suitable part thereof, but by preference at the side, near the top, as shown, by means of a pipe, B, having an elbow-bend, *a*, turning upward, in lieu of admitting the steam through the cover, as has previously been the practice in carrying out the said process.

By this means a very dry steam is obtained, which passes over the top of the basket or cage C onto the sugar contained therein, the water of condensation from any steam which may have condensed in the steam-pipes running down the sides of the casing A, and out through the outlet D, provided in the bottom for the escape of the sirup.

By thus introducing the steam we are enabled to employ a plain flat cover, as shown at E, in substitution for a cover with a steam-mouth, as has been heretofore necessary.

We also dispense with the annular guard or water-catcher previously employed, which, as the steam is dry, is not required. We further dispense with the steam outlet or chimney heretofore used, whereby we cause the whole of the steam admitted to the machine to become available for the purification of the sugar or saccharine matter, and so avoid a considerable loss of steam which in the case of the machine arranged according to the ordinary method of carrying out the said process overflows the basket or cage C and passes into the outlet-pipes, and thence escapes through the chimney.

The supply of steam to the machine should be continued until steam commences to escape around the periphery of the cover at *b*, such escape forming an indication that a sufficient quantity of steam has been admitted for operating upon the charge of sugar or saccharine matter contained in the machine, and that the steam should be shut off accordingly.

In some cases, we warm the sugar or saccharine matter previous to its introduction into the machine or when in the cage or basket of the machine. In the latter case this may be effected by means of hot air, introduced through a pipe, F, having an elbow-bend, *c*, in the same manner as, and previously or at the same time as, the steam. We find that the sugar, when thus warmed, requires less steam than when it is placed in the machine cold.

Having thus described our invention, what we claim, and desire to secure by Letters Patent, is—

1. The process of treating saccharine matter for the purpose of purifying the same by subjecting it in a centrifugal machine to dry steam, admitted into the space between the outer casing and the basket, substantially as shown and described.

2. The process of treating saccharine matter in a centrifugal machine by the combined action of steam and hot air, substantially as shown and described.

In testimony whereof I have hereunto signed my name this 13th day of January, A. D. 1877.

JAMES DUNCAN.

Witnesses:
  EWELL A. DICK,
  A. POLLOCK.

In testimony whereof I have hereunto signed my name this 3d day of February, A. D. 1877.

B. E. R. NEWLANDS.

Witnesses:
  WM. JOHN WEEKS,
    9 *Gracechurch Street*,
  CHAS. MILES,
    49 *Lincoln's Inn Fields*.